(12) United States Patent
Asami

(10) Patent No.: US 8,298,083 B2
(45) Date of Patent: Oct. 30, 2012

(54) GAME DEVICE, GAME CONTROL METHOD, INFORMATION RECORDING MEDIUM, AND PROGRAM

(75) Inventor: Yuichi Asami, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 12/735,875

(22) PCT Filed: Feb. 16, 2009

(86) PCT No.: PCT/JP2009/052565
§ 371 (c)(1),
(2), (4) Date: Aug. 19, 2010

(87) PCT Pub. No.: WO2009/104562
PCT Pub. Date: Aug. 27, 2009

(65) Prior Publication Data
US 2011/0003641 A1    Jan. 6, 2011

(30) Foreign Application Priority Data

Feb. 19, 2008  (JP) ................................. 2008-037151

(51) Int. Cl.
*A63F 13/00* (2006.01)
(52) U.S. Cl. ............................... 463/37; 463/36; 463/39
(58) Field of Classification Search .................... 463/36, 463/37, 38, 39
See application file for complete search history.

(56) References Cited

U.S. PATENT DOCUMENTS

| | | | |
|---|---|---|---|
| 5,585,584 A * | 12/1996 | Usa ................................. | 84/600 |
| 2002/0065121 A1 | 5/2002 | Fukunaga et al. | |
| 2003/0167908 A1 * | 9/2003 | Nishitani et al. ................ | 84/723 |
| 2007/0091084 A1 * | 4/2007 | Ueshima et al. .............. | 345/419 |
| 2007/0197290 A1 * | 8/2007 | Ueshima ......................... | 463/36 |
| 2008/0132335 A1 * | 6/2008 | Yamaguchi ..................... | 463/37 |

(Continued)

FOREIGN PATENT DOCUMENTS

CN  1194691 A  9/1998

(Continued)

OTHER PUBLICATIONS

International Search Report and English Translation for PCT Application No. PCT/JP2009/052565 mailed on Mar. 17, 2009, 5 pages.

(Continued)

*Primary Examiner* — James S McClellan
(74) *Attorney, Agent, or Firm* — Howard & Howard Attorneys PLLC

(57) ABSTRACT

In a game, a user competes for accuracy of user's operation of a controller depending on whether a user can swing a controller at a target point in time. In a game device (401), for accurately determining the accuracy of user's operation, a measurement unit (402) measures acceleration of the controller, an extraction unit (403) extracts a time point at which a first threshold is reached by an increasing acceleration and a time point at which the first threshold is reached by a decreasing acceleration, wherein the increasing and decreasing accelerations are measured by the measurement unit, and a determination unit (404) selects, from the time points extracted, a time point closest to the target point in time, and determines the accuracy of the user operation based on the difference between the target point in time and the time point selected.

7 Claims, 7 Drawing Sheets

U.S. PATENT DOCUMENTS

2008/0215974 A1* 9/2008 Harrison et al. ............. 715/706
2008/0280660 A1 11/2008 Ueshima et al.

FOREIGN PATENT DOCUMENTS

| | | |
|---|---|---|
| CN | 1965756 A | 5/2007 |
| JP | 2000-288253 A | 10/2000 |
| JP | 2001-070639 A | 3/2001 |
| JP | 2001-104636 A | 4/2001 |
| JP | 2001-178965 A | 7/2001 |
| JP | 2002-153673 A | 5/2002 |
| JP | 2007-300962 A | 11/2007 |
| TW | 200725380 A | 7/2007 |

OTHER PUBLICATIONS

Chinese Office Action with English Translation (Issued Jun. 14, 2012).

Taiwanese Office Action with English Translation issued Feb. 15, 2012.

* cited by examiner

REFERENCE POSITION

COMPLETING PRELIMINARY MOVEMENT

WHILE SWINGING UP

COMPLETING SWINGING UP

WHILE SWINGING DOWN

SLIGHTLY OVERSHOT

RETURING TO REFERENCE POSITION

GAME DEVICE, GAME CONTROL METHOD, INFORMATION RECORDING MEDIUM, AND PROGRAM

TECHNICAL FIELD

The present invention relates to a game device, a game control method, a computer-readable information recording medium that stores a program for implementing the device and method on a computer, and a program ideal for determining the accuracy of a user's operation of a controller in a game in which the competition is based on the ability to swing a controller at target points in time.

BACKGROUND ART

Conventionally, rhythm games and flag games in which a player steps on a foot switch or depresses buttons on a controller in sync with music and tasks displayed on a screen have been proposed. The techniques of the rhythm games are disclosed in the patent literature described below.

Patent Literature 1 discloses a dance game device in which dance instruction data set in a rhythm setting unit is read out from a dance instruction data memory for realizing a dancing game that is impressive and creates a sense of rhythm by allowing a user to use a whole body to express sense of rhythm to the music, and conducting performance in sync with the sequential instructions. Then, a display control unit displays a character for guiding a dance, and indicates movement to the music within the dance area on a monitor. The instructions for the dance movement's timing are given by the movement of the character. When a player dances by following the content displayed on the monitor, a detection means detects the movement, and a dance movement monitor loads the movement. An amount of gap detection/integrating unit calculates a score according to the gap in timing, and the rhythm setting unit evaluates the score. Subsequently, the next dance instruction data is set according to the evaluated result.

The detection means is allocated with switches placed on the back and the front, and the right and the left of the pad, and the detection means detects steps that a player performed in a dance depending on the on-off status of the switches.

[Patent Literature 1] Unexamined Japanese Patent Application KOKAI Publication No. 2001-178965

DISCLOSURE OF INVENTION

Problem to be Solved by the Invention

In dancing, movement of the player's hands also plays an important role. Therefore, there is a great demand for realizing a game that determines whether a player dances well depending on whether the movement of the player's hands picks up the beat. There is also a demand for realizing the game by allowing a user to use a hand controller, which has become significantly popular in recent years, and utilization of the measured values by an accelerometer embedded in the controller.

In these occasions, for example, it is required to consider a preliminary motion, such as, for example, a subconscious movement of an individual's hands slightly downward just before swinging up their hands. Moreover, it is also required to consider the influence of the acceleration on the human body when a player steps. Thus, an easy determination technique that restrains computational load while considering these conditions is strongly desired.

An objective of the present invention, being devised in order to solve such problems, is to provide a game device, a game control method, a computer-readable information recording medium containing a program for implementing the device and method on a computer, and a program that is suitable for determining the accuracy of a user's operation of a controller in a game in which the competition is based on the ability to swing a controller at target points in time.

Means for Solving the Problem

To achieve the above objective, based on the principle of the present invention, the following invention is disclosed.

A game device in accordance with a first aspect of the present invention determines the accuracy of user's operation of a controller depending on whether a user moves a controller at the predetermined target points in time. The game device is provided with a measurement unit, an extraction unit, and a determination unit. Furthermore, the game device is configured as described below.

That is, the measurement unit measures acceleration of the controller.

Typically, a controller is handheld and is equipped with an accelerometer using a gyroscope and a strain gauge. Therefore, it is possible to detect the acceleration that the accelerometer experiences when a user swings the controller. Furthermore, the acceleration of the movement such as swinging up legs may also be measured by fastening the controller to a boot, for example.

The extraction unit extracts a time point at which a first threshold is reached by an increasing acceleration and a time point at which the first threshold is reached by a decreasing acceleration, the increasing and decreasing accelerations being measured by the measurement unit.

Generally speaking, when individuals swing a part of their bodies, the acceleration is not constant but gradually increases and then decreases. In view of the case, for example, where a player swings up a controller, if a preliminary motion is ignored when the controller is in a reference position, upward acceleration occurs, upward speed is added to the controller, and the controller moves up. After the controller moves up to a certain level, the acceleration of the controller decreases and turns negative. Along with this, the speed of the controller also gets closer to 0. The time point where the speed becomes 0 is the time point at which the controller is swung to the highest point. Then, the speed of the controller decreases. After the controller moves down to a certain level, the acceleration of the controller increases and turns positive. Along with this, the speed gets closer to 0. The time point where the speed is 0 is the original reference position.

In such a process, when the controller is swung in a try to time to a target point in time, seemingly, the controller is making the closest to the target when the controller is at the highest point. However, in fact, this is a coincidence that rarely occurs, due to physiques, habit of players' movement, preference for holding a controller, measurement environment or all other various factors that are influential. If the hand motions should be accompanied by steps taken by legs, the acceleration caused by the motion of legs is also subject to the measurement in the controller. Therefore, even if the acceleration is integrated, a position where the controller is swung up cannot always be acquired immediately.

Then, when considering a graph of the acceleration, the instant at which the height of the graph passes a first threshold is extracted. It is assumed that practically no acceleration of human movement remains constant. Thus, the time point at which a first threshold is reached by an increasing acceleration and the time point at which the first threshold is reached by a decreasing acceleration, the increasing and decreasing accelerations being measured by the measurement unit, are extracted.

Furthermore, the determination unit selects a time point closest to the target point in time from the extracted time points. Then, the determination unit determines the accuracy of the user's operation by the difference between the target point in time and the selected time point.

In other words, the determination unit selects a time point closest to the target point in time from the two types of time points. Then, the determination unit determines that the smaller the difference between the selected time point and the target point in time (the closer the two time points), the more accurate the play.

The inventor's experiments made clear that as a player gets used to play, the force exerted when controlling a controller gets smaller and the range of the change in the acceleration gets smaller as well. In this case, the distance between the two time points extracted by the extraction unit gradually gets shorter as playing skill improves.

For beginners, on the other hand, much redundant movement is involved. Therefore, the acceleration does not always follow the process shown above. The acceleration changes several times in a zig-zag manner, and in some cases, more than one moment passing the first threshold may be observed.

The present invention provides a predetermined threshold time. Typical method is to add or subtract scores as "success" when the time between a selected time point and a target point in time is shorter than the predetermined threshold time and as "failure" when the time between a selected time point and a target point in time is longer than the predetermined threshold time. Moreover, a method that the smaller the difference between the two time points, the larger the scores obtained may be applied.

When providing such criteria for determination, the timing determination becomes strict on advanced players who dance well, and the timing determination becomes easy if more redundant movement is involved, such as, a beginner's movement.

Therefore, according to the present invention, the accuracy of the operation can be accurately determined in a game in which the competition is based on the ability to swing a controller at the target points in time.

Moreover, in accordance with the game device of the present invention, the extraction unit may be configured to also extract a time point at which a second threshold is reached by an increasing acceleration and a time point at which the second threshold is reached by a decreasing acceleration, the increasing and decreasing accelerations being measured by the measurement unit. The sign of the second threshold is a reverse sign of the first threshold.

As stated above, the acceleration shifts between positive and negative in one upward swing motion. Furthermore, a large number of players apply downward swing motions instead of upward swing motions when they adjust the timing. Additionally, in a dancing game, it is preferable to determine the timing of the motion, while giving some degree of choreographical freedom to the players.

Then, the extraction unit extracts every point in time that passes through a first threshold (A) or a second threshold (−A) in an acceleration graph that appoints −A as a reverse sign of A.

In the present invention, accuracy of operation of controller swing motions can be determined with some degree of freedom to the players' motion.

In addition, the measurement unit of the game device can be configured to periodically measure acceleration of a controller within a predetermined time zone, including the target point in time. Furthermore, the extraction unit can be configured to interpolate the measured acceleration of the controller to extract a time point at which the threshold is reached.

As disclosed in Patent Literature 1, a dancing game shows the timing of target points in time as a musical score on a screen, etc. to notify a player. Therefore, it is possible to determine whether a player succeeded in "swinging a controller in accordance with a target point in time" by measuring the acceleration only for a certain period of time around the target point in time.

The present invention can reduce the possibility of incorrect judgment on motions other than conscious motions of the controller by a player.

A game control method according to another aspect of the present invention is executed by a measurement unit, an extraction unit, and a determination unit, that are included in a game device that determines the accuracy of user's operation depending on whether the user moves a controller at a predetermined target point in time. The game control method also comprises a measuring step, an extracting step, and a determining step; the steps are configured as follows.

In the measuring step, the measurement unit measures acceleration of a controller.

On the other hand, in the extracting step, the extraction unit extracts a time point at which a first threshold is reached by an increasing acceleration and a time point at which the first threshold is reached by a decreasing acceleration, the increasing and decreasing accelerations being measured by the measurement unit.

Furthermore, in the determining step, the determination unit selects a time point closest to the target point in time from the extracted time points and determines the accuracy of the user operation by the difference between the target point in time and the selected time point.

Moreover, in the game control method of the present invention, the extracting step can be configured as further extracting a time point at which a second threshold is reached by the increasing acceleration and a time point at which the second threshold is reached by the decreasing acceleration, the increasing and decreasing accelerations being measured by the measurement unit. The sign of the second threshold is a reverse sign of the first threshold.

A program according to another aspect of the present invention causes a computer to function as each unit of the above-described game device and to execute each step of the above-described game control method.

Furthermore, the program of the present invention may be stored on a computer-readable information recording medium, such as a compact disc, a flexible disk, a hard disk, a magneto-optical disk, a digital video disc, magnetic tape, or semiconductor memory.

The program described above may be distributed and sold independently of the computer whereupon the program is executed via a computer communications network. In addition, the information recording medium described above may be distributed and sold independently of the computer.

Effect of the Invention

According to the present invention, a game device, a game control method, a computer-readable information recording medium that stored a program for implementing the device and method on a computer, and a program suitable for accurately determining accuracy of operation regarding a game in

Figure 1:
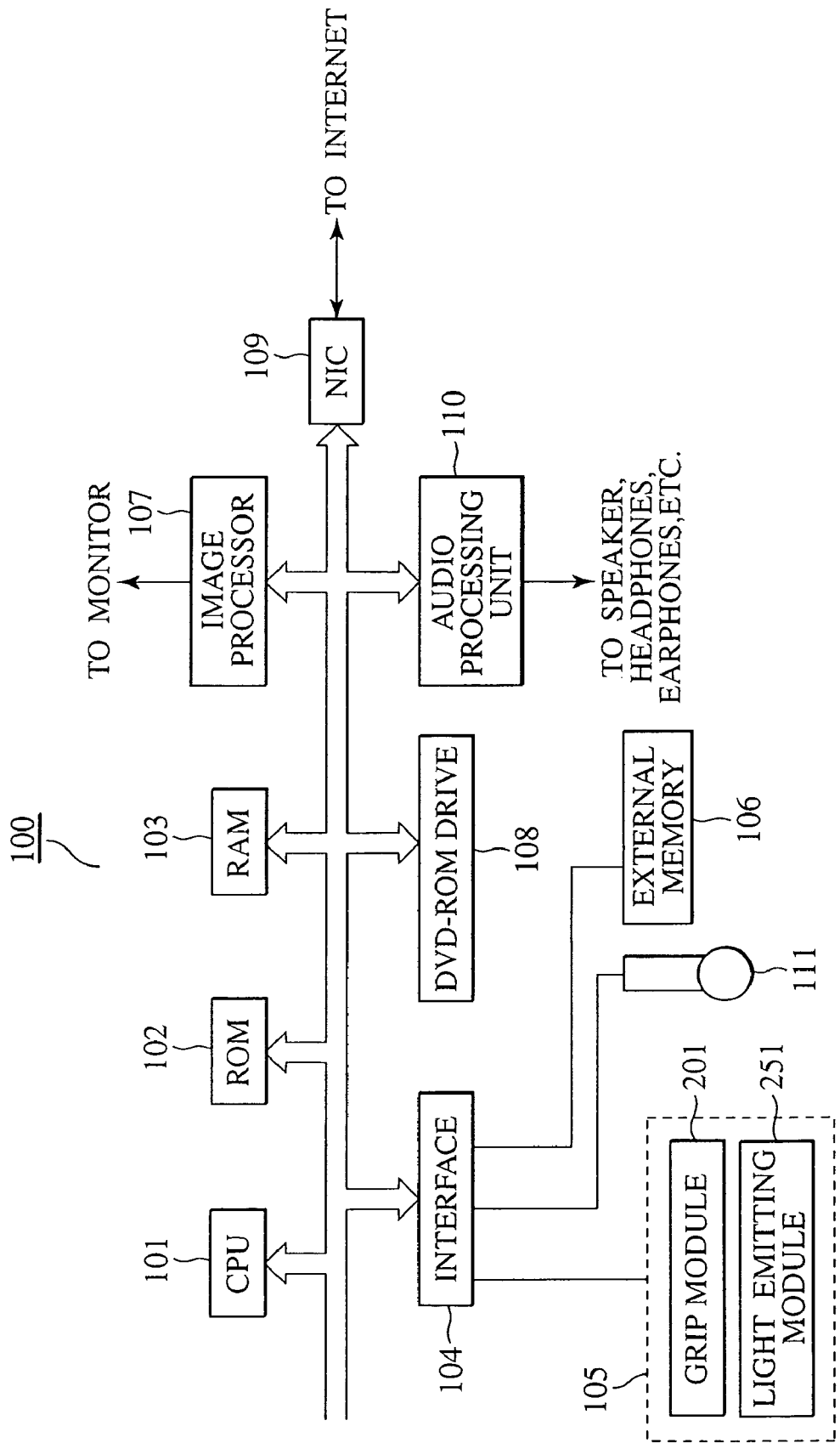
[FIG. 1] A schematic diagram showing the general configuration of a typical information processing device.

EXPLANATION OF NUMERICAL REFERENCES 100 information processing device
101 CPU
102 ROM
103 RAM
104 interface
105 controller
106 external memory
107 image processor
108 DVD-ROM drive
109 NIC
110 audio processing unit
111 microphone
201 grip module
202 CCD camera
203 cross-shaped key
204 button A
205 button B
206 various buttons
207 indicator
208 power supply button
251 light emitting module
252 light emitting diode
291 television device
301 reference position
302 reference axis
401 game device
402 measurement unit
403 extraction unit
404 determination unit

BEST MODE FOR CARRYING OUT THE INVENTION

Hereinafter, an embodiment of the present invention will be described. In order to ease understanding of the following, an embodiment wherein the present invention has been executed by utilizing an information processing device for a game will be described. However, the embodiment described hereinafter is for sake of explanation, and does not limit the scope of the present invention. Consequently, while it is possible for those skilled in the art to adopt embodiments wherein some or all of the elements herein have been replaced with respective equivalents, such embodiments are also to be included within the scope of the present invention.

Embodiment 1

FIG. 1 is a schematic diagram showing the general configuration of a typical information processing device that can operate as a game device according to the embodiment of the present invention after executing a program. Hereinafter, an embodiment of the present invention will be described with reference to this drawing.

An information processing device 100 may be configured as providing a CPU (Central Processing Unit) 101, a ROM 102, a RAM (Random Access Memory) 103, an interface 104, a controller 105, an external memory 106, an image processor 107, a DVD-ROM (Digital Versatile Disc ROM) drive 108, an NIC (Network Interface Card) 109, an audio processing unit 110, and a microphone 111. Various input-output devices are possible to be omitted arbitrarily.

By inserting a DVD-ROM storing a program and data for a game into the DVD-ROM drive 108 and powering on the information processing device 100, the program is executed, and the game device of the present embodiment is realized.

Furthermore, a portable game machine may utilize a slot for a ROM cassette instead of utilizing the DVD-ROM drive 108 to allow the game machine to be portable. In this case, by inserting a ROM cassette containing a program, the program is executed, and the game device of the present embodiment is executed.

The CPU 101 controls the overall operation of the information processing device 100. The CPU 101 is connected to individual components for exchanging control signals and data. Furthermore, by using an ALU (Arithmetic Logic Unit) (not shown), the CPU 101 can perform arithmetic operations such as addition, subtraction, multiplication, and division, logical operations such as logical addition, logical multiplication, and logical negation, bit operations such as bit addition, bit multiplication, bit inversion, bit shift, and bit rotation, on a register (not shown) that is a storage area capable of being accessed at high speed. Furthermore, the CPU 101 itself may be structured to rapidly perform saturate operations such as addition, subtraction, multiplication, and division, trigonometric functions, and vector operations, etc. for handling multimedia processing, or may realize these operations with a coprocessor.

The ROM 102 stores an IPL (Initial Program Loader), which is executed immediately after power-on. By the CPU 101 executing the IPL, the program stored on the DVD-ROM is read into the RAM 103, and execution of the program by the CPU 101 is commenced. Furthermore, the ROM 102 also stores programs and various data for an operating system necessary for controlling the overall operation of the information processing device 100.

The RAM 103 is for temporal storage of data and programs, and retains the programs and data read out from the DVD-ROM, as well as data required for other operation, such as processing the game or conducting chat communication. The CPU 101 allocates a variable area in the RAM 103, and executes processes by performing operations directly with the ALU on the value stored as the variable, or after storing the value from the RAM 103 to a register to perform operations toward the register, the operation results are written to memory, etc.

The controller 105, connected via the interface 104, receives control input made by a user playing a game. The details of the controller 105 are described below.

The external memory 106, being detachably connected via the interface 104, stores information such as data representing a play status of a game, etc. (past achievements, etc.), data representing state of progress of a game, data of chat communication logs (records) for playing over a network, in a rewritable manner. By issuing command input via the controller 105, the user can appropriately store the data on the external memory 106.

DVD-ROM loaded into the DVD-ROM drive 108 stores the program for realizing the game, as well as image and audio data associated with the game. Under the control of the CPU 101, the DVD-ROM drive 108 reads out the necessary program and data by conducting read out processing from the DVD-ROM loaded therein. The read out information is then temporarily stored in the RAM 103 or in a similar memory.

The image processor 107 processes data read out from the DVD-ROM by using the CPU 101 and an image operation processor (not shown) provided in the image processor 107, and then stores the resulting data in a frame memory (not shown) provided in the image processor 107. The image information stored in the frame memory is converted into a video signal at a predetermined synchronous timing, and subsequently output to the television device connected to the image processor 107. Thereby, various image displays are available.

The image operation processor herein is able to execute transparent operations such as a blending and overlay operation of two-dimensional images, as well as various saturate operations, at high speed.

In addition, the image operation processor is also able to execute high-speed computations whereby polygon information, being arranged in a virtual three-dimensional space and having various kinds of texture information added thereto, is rendered by means of z-buffering, thereby acquiring a rendered image as downwardly seen from a given point of view of the polygons arranged in the virtual three-dimensional space from a given point of view.

Furthermore, by means of the CPU 101 operating in cooperation with the image operation processor, it is possible to draw a string of characters as a two-dimensional image in the frame memory or draw on respective polygon surfaces, according to font information that defines the shape of characters.

The NIC 109 serves to connect the information processing device 100 to computer communications network (not shown) such as the Internet. The NIC 109 may conform to the 10BASE-T/100BASE-T standard used when forming a LAN, or alternatively, the NIC 109 may be made up of a modem, such as an analog modem for connecting to the Internet using a telephone circuit, an ISDN (Integrated Services Digital Network) modem, an ADSL (Asymmetric Digital Subscriber Line) modem, or a cable modem for connecting to the Internet using a cable television circuit, as well as an interface (not shown) that interfaces between the CPU 101 and any one of the above modems.

The audio processing unit 110 converts audio data read out from the DVD-ROM into an analog audio signal, and then causes the analog audio signal to be output from a speaker (not shown) connected thereto. In addition, under the control of the CPU 101, the audio processing unit 110 also generates sound effects and music data that should be generated as the game progresses, and subsequently causes the speaker, a headphone (not shown), and an earphone (not shown) to output the sound corresponding thereto.

When the sound data stored on the DVD-ROM is MIDI data, the audio processing unit 110 refers to the sound source data that the audio processing unit 110 possesses, and converts the MIDI data to PCM data. Furthermore, when the sound data stored on the DVD-ROM is sound data compressed in ADPCM format, Ogg Vorbis format, etc., the audio processing unit 110 extracts the data to convert to PCM data. The PCM data is subjected to D/A (Digital/Analog) conversion at a timing corresponding to the sampling frequency and outputs to the speaker, thereby enabling audio output.

Furthermore, the information processing device 100 can be connected with the microphone 111 via the interface 104. In this case, A/D conversion is performed on an analog signal from the microphone 111 at an appropriate sampling frequency to generate a digital signal in the PCM format so that the audio processing unit 110 can process the signal such as by mixing.

The information processing device 100 may use a large capacity external storage device such as a hard disk and configure to perform the same function as the ROM 102, the RAM 103, the external memory 106, the DVD-ROM loaded in the DVD-ROM drive 108, or the like.

It is also possible to employ an embodiment where a keyboard for accepting a character string editing input from the user, and a mouse for accepting various position designations and selection inputs from the user are connected. Furthermore, a general-purpose personal computer may be used instead of the information processing device 100 of the present embodiment.

The present embodiment employs a controller 105 capable of measuring various parameters such as acceleration, position, and posture of a real space.

Figure 2:
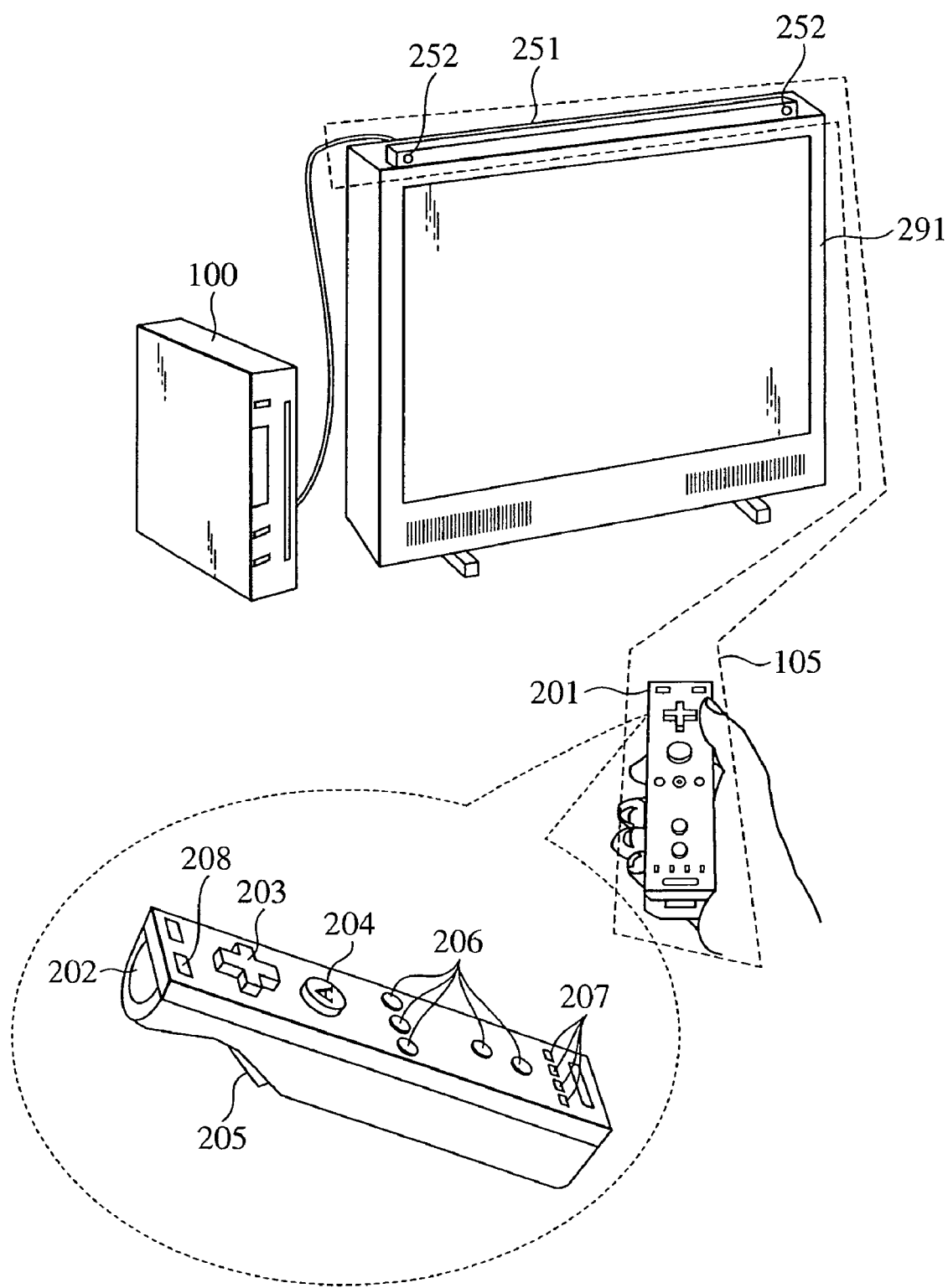
[FIG. 2] An illustrative diagram showing a controller and an information processing device.

FIG. 2 is an illustrative diagram showing the controller 105 and the information processing device 100 for enabling the measurement of various parameters such as position and posture in a real space. Hereinafter, the embodiment of the present invention will be described with reference to this drawing.

The controller 105 comprises a combination of a grip module 201 and a light emitting module 251. The grip module 201 is connected to the information processing device 100, enabling communications with the information processing device 100 via wireless communications. The light emitting module 251 is connected to the information processing device 100, enabling communication with the information processing device 100 with a wire. The sound and images, which are the processing results by the information processing device 100, are output and displayed on a television device 291.

The grip module 201 has an appearance similar to a remote controller of the television device 291. A CCD camera 202 is provided at the distal end of the grip module 201.

The light emitting module 251 is fixed on the upper portion of the television device 291. Light emitting diodes 252 are provided on both ends of the light emitting module 251, and emit light when the light emitting diodes 252 are supplied with power from the information processing device 100.

The CCD camera 202 of the grip module 201 captures images of the light emitting module 251.

The information of the captured image is transmitted to the information processing device 100. The information processing device 100 acquires the position of the grip module 201 with respect to the light emitting module 251 according to the position that the light emitting diodes 252 are captured within the captured image.

Furthermore, the grip module 201 is embedded with, for example, an accelerometer, an angular accelerometer, and an inclination sensor. The grip module 201 can measure the acceleration, angular acceleration, speed, angular speed, position, and posture of the grip module 201 itself. The results of these measurements are also transmitted to the information processing device 100.

Measurement of acceleration is performed by using a sensor such as a gyroscope and a strain gauge. Currently, inexpensive sensors that measure three axes are provided. However, the sensor does not have to be three axes. Furthermore, according to the present embodiment, measuring the acceleration in a direction that the user is presumed to swing the controller 105 is a typical method. Measurements in a direction of a centrifugal force generated by the swing of the controller 105 may also be employed.

On the upper surface of the grip module 201, a cross-shaped key 203 is provided. The player depresses the cross-shaped key 203 to input various instructions. Not only button A 204 but also various buttons 206 are provided on the upper surface for inputting respective instructions assigned to the buttons.

On the other hand, button B 205 is provided on the lower surface of the grip module 201. The button B 205 coupled with a recess formed on the lower surface of the grip module 201 represents a trigger of a rifle or a reacher. In general, the button B is used for instructions input by holding the reacher or by shooting the rifle in a virtual space.

An indicator 207 on the upper surface of the grip module 201 presents a player with operation status of the grip module 201, status of wireless communications with the information processing device 100, and the like.

A power supply button 208 provided on the upper surface of the grip module 201 itself might be a means of turning the operation of the grip module 201 on and off. The grip module 201 is powered by a built-in battery (not shown).

The grip module 201 is also provided with a vibrator (not shown) inside. The vibrator can control the presence and level of vibration according to the instructions from the information processing device 100.

Hereinafter, an example of utilizing the grip module 201 in which an accelerometer is built-in, and using the results of the measurement from the controller 105 providing the grip module 201 without accumulating various types of errors is explained. However, cases of obtaining acceleration from the results of the measurement by measuring the position and posture of the grip module 201 in the real world with the use of above-described various methods of measurement, or by measuring the position and posture of the grip module 201 in the real world with the use of ultrasonic waves, infrared communications, a GPS (Global Positioning System), etc. are also included in the scope of the present invention.

The information processing device 100 discussed above is equivalent to a so-called consumer-oriented television game device. However, as long as a device has a function of measuring acceleration for example, the present invention can be put into practice. Accordingly, the present invention can be practiced on a variety of computing machinery, such as a mobile phone and portable game device equipped with an accelerometer, and a karaoke machine equipped with an accelerometer on a microphone.

It is assumed, in the present embodiment, that the game is a similar one as those described in Patent Literature 1 or other prior publications. In such games, a target geometry travels on screen in a predetermined direction at a predetermined speed. If a player inputs in sync with the timing the target geometry reaches the position of an aim, the player gains a score as being successful in making inputs in sync with the rhythm. When target geometries appearing on screen, the player can be prepared to perform input operation. The player can perform the input operation while following the target geometries moving in the their sight. In the present embodiment, the input operation is performed by swinging the grip module 201.

FIGS. 3A, 3B, 3C, 3D, 3E, 3F, and 3G are illustrative figures showing one example, in the time series, of a player swinging the grip module 201 when a target point in time is presented to the player.

Figure 4:
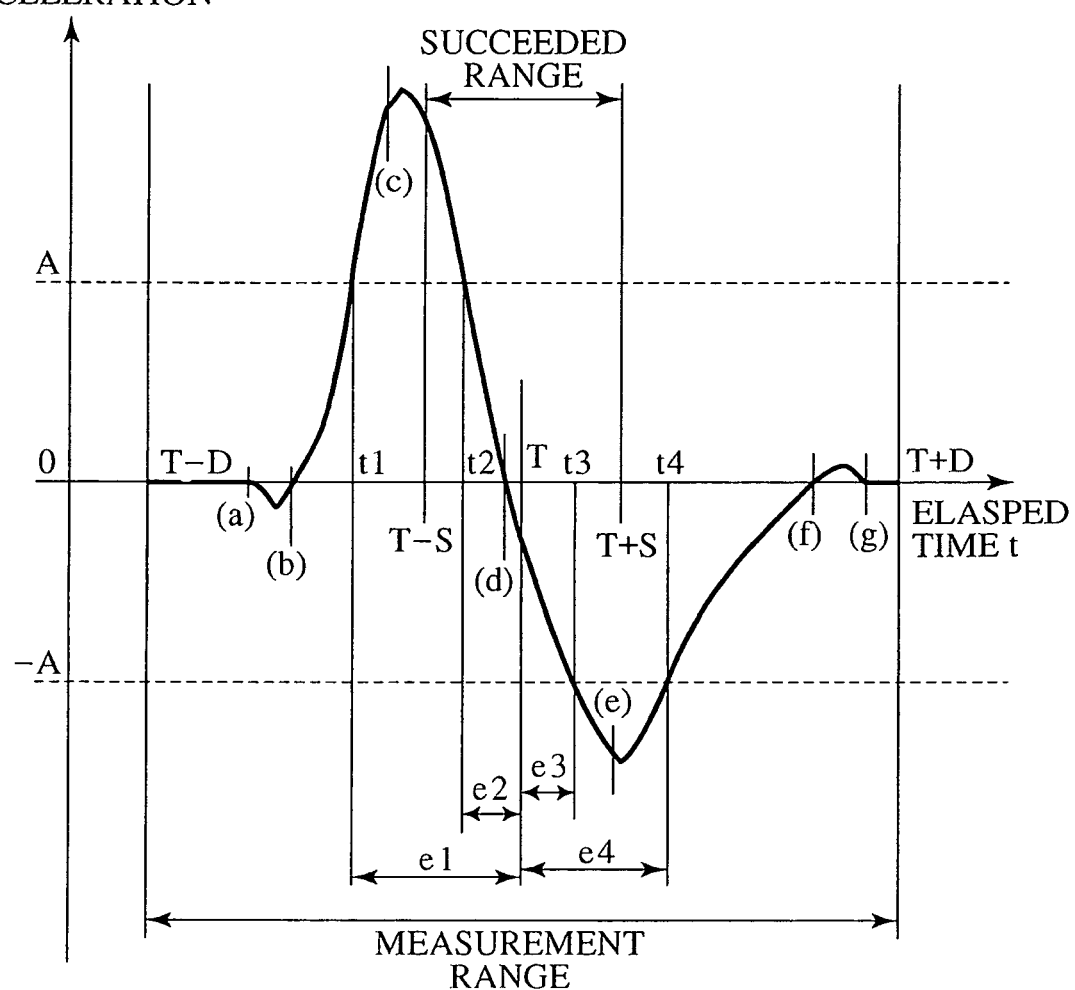
[FIG. 4] A graph showing an example of the aspect of the measured acceleration change.

FIG. 4 is a graph showing one example of the acceleration change measured when the player swing the grip module 201 above. Hereinafter, an explanation will be given with reference to these figures.

Moreover, time points equivalent to the time points of each of FIGS. 3A to 3G are marked with corresponding alphabets (a) to (g).

An example shown in these drawings is the result of measuring the acceleration in an assumed direction that the player will swing the grip module 201 (a direction perpendicular to a direction that a centrifugal force is supposedly applied when the grip module 201 is swung). In the drawings, the horizontal axis shows the time course and the vertical axis shows the acceleration.

In the present embodiment, since the acceleration is discretely-measured at a given time interval, a measurement graph essentially has discontinuous values. However, the points representing each measured value are connected by line segments to interpolate.

Figure 3A:
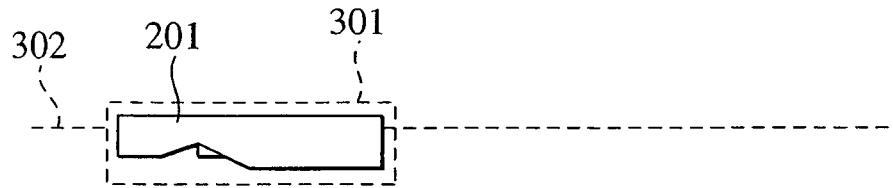
[FIG. 3A] An illustrative diagram showing the aspect that a player swings a grip module of a controller in time sequence, and showing the aspect of a point in time when the grip module is in the reference position.

FIG. 3A shows an illustration of the time point (a) at which the grip module 201 in a direction along a reference axis 302 at a reference position 301 is arranged.

A player assumes a prospective target point in time T by watching the target shape moves on a screen and the player operates the grip module 201. Therefore, the user starts swinging the grip module 201 that the user holds at the standard position before the time reaches to the target point in time T. Here, in the measurement, a start time point is set to a time point that is time D before the target point in time T, and a finish time point is set to a time point that is time D after the target point in time T. In other words, the acceleration is measured within the measurement zone [T−D, T+D].

Hereinafter, it is explained as the operation intended by the player is swinging up of the grip module 201. Furthermore, in a case where the operation intended by the player is swinging down of the grip module 201, the below-described explanation needs to be interpreted in an opposite manner.

Many players, as a preliminary motion, move the grip module 201 slightly towards a direction opposite to a direction that the players intended to move, or a direction of swinging down.

Figure 3B:
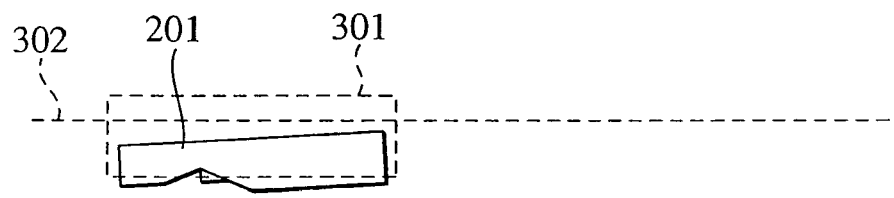
[FIG. 3B] An illustrative diagram showing the aspect that a player swings a grip module of a controller in time sequence, and showing the aspect of a point in time when a preliminary motion is completed.

FIG. 3B shows an illustration of the time point (b) at which the grip module 201 is slightly swung down by the preliminary motion.

Due to this, the acceleration of the grip module 201 initially becomes negative.

After the preliminary motion, the acceleration of a swing up direction is measured positive since the players swing the grip module 201 to the intended direction.

Subsequently, a point in time when the acceleration starts decreasing and the value becomes 0 is a point in time when the moving speed of the grip module 201 is maximized.

Figure 3C:
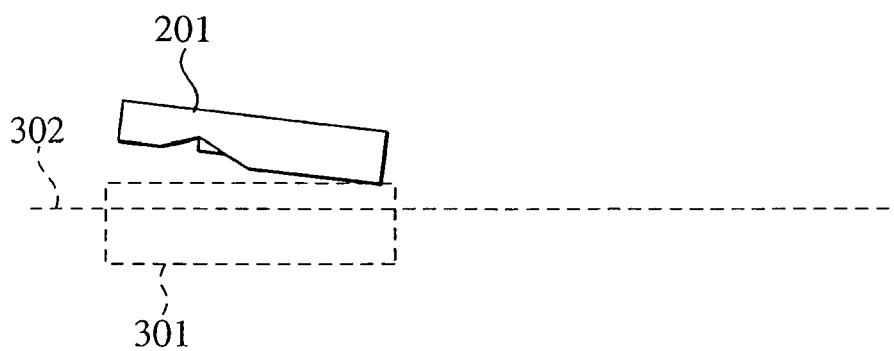
[FIG. 3C] An illustrative diagram showing the aspect that a player swings a grip module of a controller in time sequence, and showing the aspect of a point in time that is in the middle of swinging up of the grip module.

FIG. 3C shows an illustration of the time point (c) at which the grip module 201 starts to be swung up in an intended direction.

Theoretically, it is assumed that the timing when this time point above and the target point in time T are matched is considered right. However, since the sensitivity and behavior of individuals vary, individuals may find it awkward if such theory is strictly applied. Therefore, in order to allow some degree of tolerance for the diversity of behavior and sensitivity of individuals, a devised standard for determining "optimal timing" is required.

Now, when the acceleration turns negative, the moving speed of the grip module 201 is gradually slowed down, and the moving speed becomes 0, the grip module 201 is considered to be swung up to the highest level.

Figure 3D:
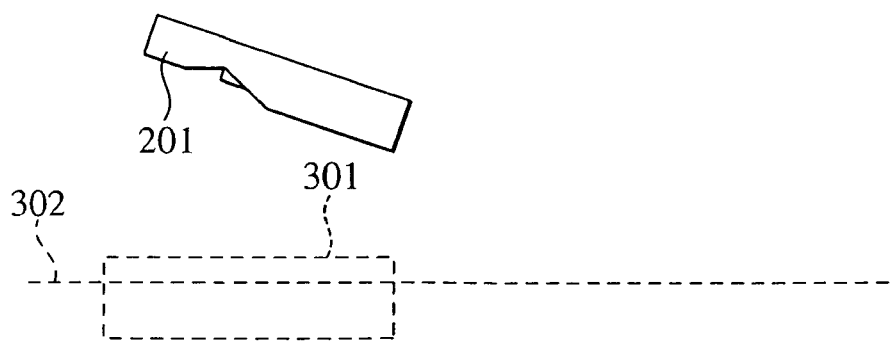
[FIG. 3D] An illustrative diagram showing the aspect that a player swings a grip module of a controller in time sequence, and showing the aspect of a point in time when swinging up of the grip module is completed.

FIG. 3D shows the time point (d) at which the swing up of the grip module 201 is completed.

After the swing up has completed, the grip module 201 further accelerates to the negative direction and the moving direction starts to move opposite to a direction that the player intended to move.

Figure 3E:
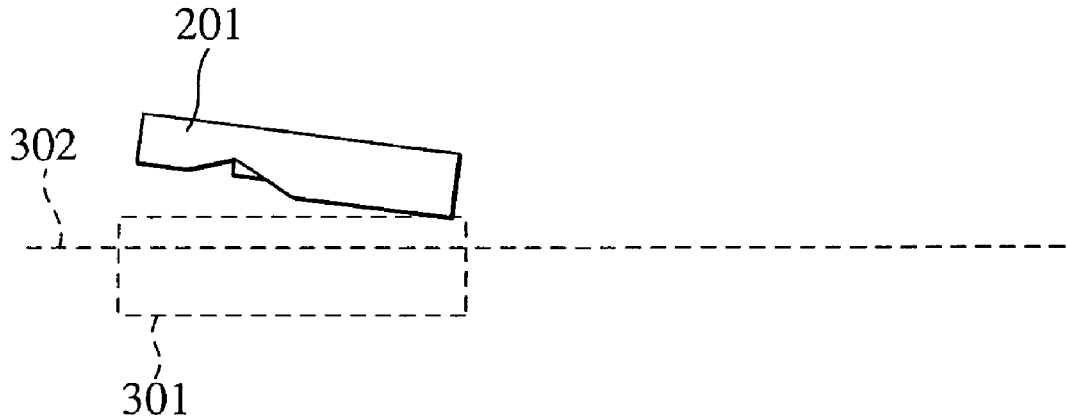
[FIG. 3E] An illustrative diagram showing the aspect that a player swings a grip module of a controller in time sequence, and showing the aspect of a point in time that is in the middle of swinging down of the grip module.

FIG. 3E shows the time point (e) that is on a way back to the original reference position 301 by swinging down the grip module 201.

When this motion continues, the grip module 201 would be brought back to the original reference position 301. However, many players swing the grip module 201 to slightly pass over the original reference position 301.

Figure 3F:
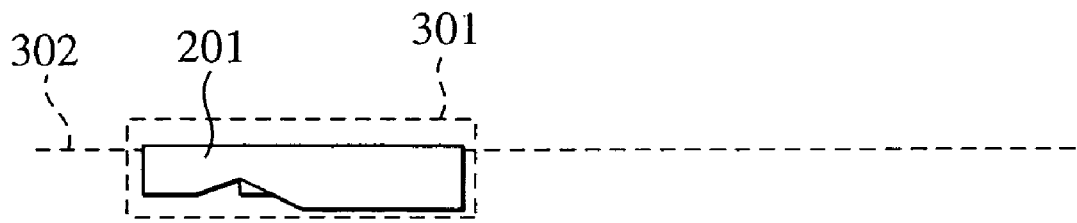
[FIG. 3F] An illustrative diagram showing the aspect that a player swings a grip module of a controller in time sequence, and showing the aspect of a point in time that passes the reference position after swinging down of the grip module is completed.

FIG. 3F shows the time point (f) at which the grip module 201 passes over the reference position 301.

Then, the players bring back the position of the grip module 201 to the original reference position 301.

Figure 3G:
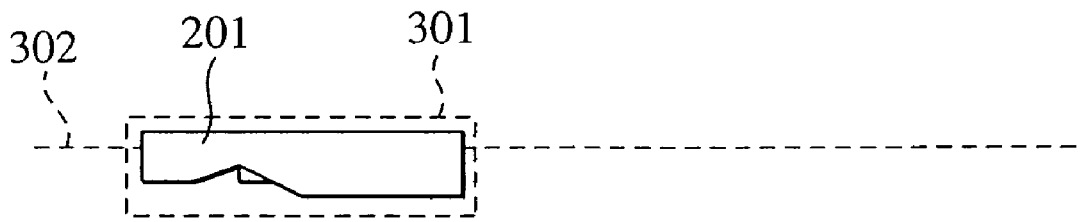
[FIG. 3G] An illustrative diagram showing the aspect that a player swings a grip module of a controller in time sequence, and showing the aspect of a point in time when the grip module returns to the reference position.

FIG. 3G shows the time point (g) at which the grip module 201 is back to the reference position 301.

This process is exactly opposite behavior of the preliminary motion.

As described above, a moment that can be determined as "optimal timing" is required, considering the sensitivity of various players, from the aspect of changing acceleration.

In the present embodiment, predetermined threshold A and threshold −A are provided for the acceleration. In the present figure (FIG. 4), horizontal lines corresponding to the threshold A and threshold −A are drawn with dashed lines. In the present embodiment, the points in time when the acceleration graph intersects with the horizontal lines of the thresholds are extracted. In the present figure, there are four crossing points that the horizontal lines of the thresholds and the graph cross; time is t1, t2, t3, and t4 respectively. Among these time points, a time point of which the absolute value of the difference from the target point in time T ($e1=|t1-T|$, $e2=|t2-T|$, $e3=|t3-T|$, $e4=|t4-T|$), or the error, is minimum is selected.

In the example shown in the present figure, the error e3 corresponding to t3 is minimum. Here, in the case of the present example, the point in time point when a player inputs an operation is determined as t3 and the temporal error of the operation is determined as e3.

There are some methods, for example the method shown below, that are probable regarding how to give scores as a game.

(1) In a case where an error of the selected time point is less than or equal to a predetermined width S, in other words, at least one time of the crossing points is included within a success zone [T−S, T+S] including the target point in time T, scores are given as "operated input succeeded".

(2) Preparing a score table or functions in which scores are maximum when the error of the selected time point is 0, and scores rapidly decrease as the error increases. Then, calculating scores to be added from the absolute value of the error between the selected time point and the target point in time T by referring to the score table or by applying the functions.

Furthermore, the threshold A typically adopts an appropriate value that is insusceptible to disturbance after performing measurements of many players beforehand.

Moreover, a skillful player moves the grip module 201 smoothly to make the change of the acceleration smooth as well as lighten the swinging strength of the grip module 201. Subsequently, the skillful player plays a game without immediate acceleration increase. When players play as above, t1 and t2 of this figure would get closer to each other and t3 and t4 of this figure would get closer to each other.

Therefore, as players become skillful, eventually the difference between "the point in time when the acceleration reached the threshold" and "the target point in time" is used for point rating. Especially, in a case where method (2) above is used, beginners can score, and the skilled players can enjoy increasing scores by accurate operation. The method (2) above is suitable for any type of player.

Furthermore, in the above-mentioned explanation, the two values, A and −A are used as thresholds. However, only A may be used or a plurality of values, A, B, . . . and −A, −B, . . . may be used. For ease of understanding, the following provides an explanation applying A and −A as thresholds.

Figure 5:
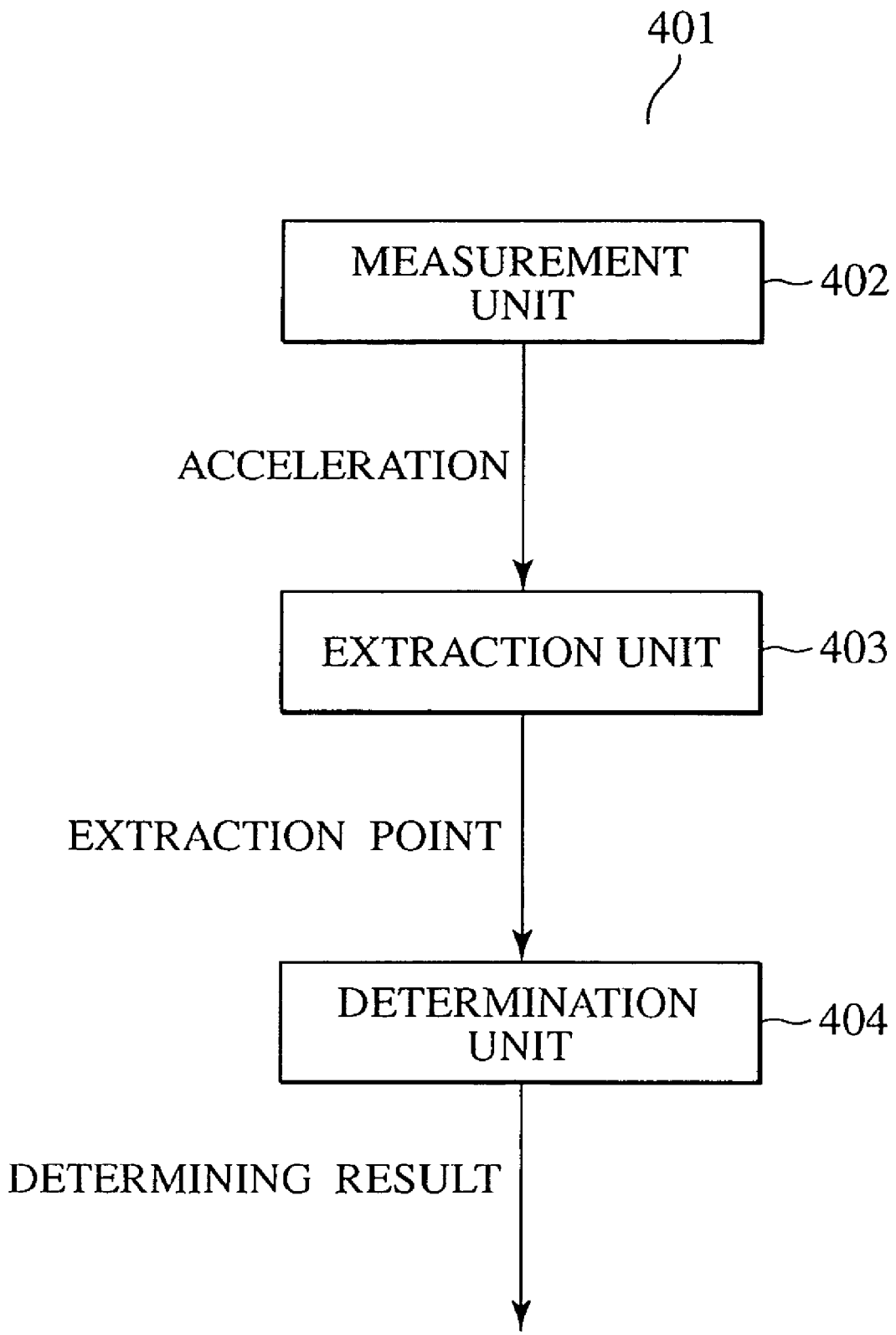
[FIG. 5] A schematic diagram showing the general configuration of a game device according to an embodiment of the present invention.

FIG. 5 is a view of the general structure of a game device according to the present embodiment. Hereinafter, an explanation will be given with reference to this figure.

A game device 401 according to the present embodiment determines the accuracy of user's operation of a controller depending on whether the user moved the grip module 201 of the controller 105 at a predetermined target point in time. The game device 401 comprises a measurement unit 402, an extraction unit 403, and a determination unit 404. The structures are realized in an information processing device 100 by executing a program.

Here, the measurement unit 402 is the controller 105 that measures the acceleration of the grip module 201. As described above, the measurement unit 402 corresponds to the accelerometer using a gyroscope and a strain gauge.

Figure 6:
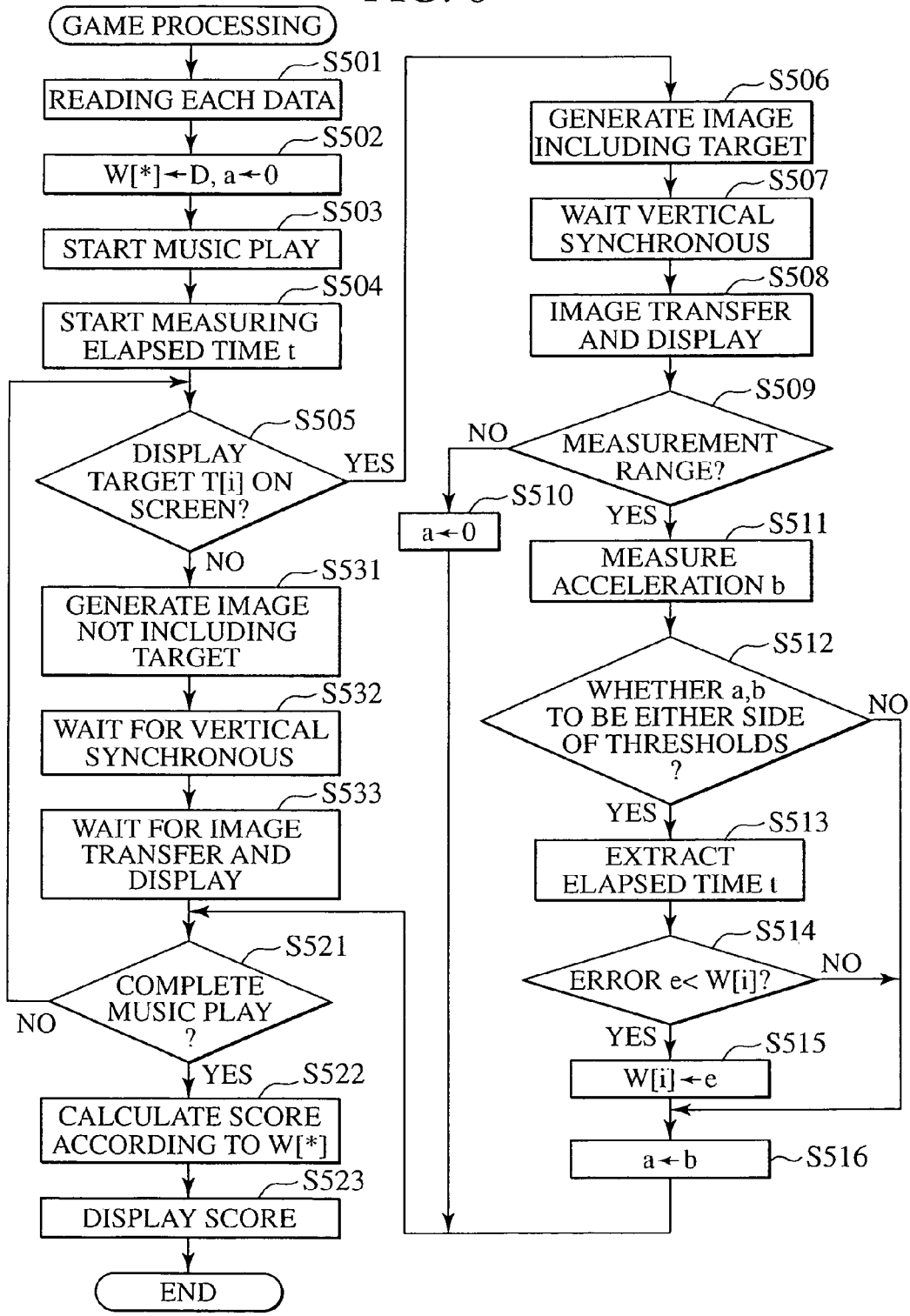
[FIG. 6] A flowchart showing the flow of controlling the game processing that is executed on a game device according to an embodiment of the present invention.

FIG. 6 is a flowchart showing the flow of controlling the game process executed in the game device 401 according to the present embodiment. The process is executed by executing the program in the information processing device 100. Hereinafter, an explanation will be given with reference to this figure.

At first, when a program for a game is launched, the CPU 100 initializes the RAM 103 and reads out music data to play and target points in time T[1], T[2], T[N] that the user should swing the grip module 201 to the music, threshold A, acceptable range S, and extraction time range D (step S500). Setting as S<D is general. Furthermore, the target points in time T[1], T[2], T[N] are generally shown by the elapsed time since the music started to play; however, the target points in time may be put into the music data Then, a temporary variable, which is used to save the acceleration measurement results, is initialized to 0, and variables w[1], w[2], w[N], which are used to save errors to each of the target points in time, are initialized to D (step S502). In this figure, performing processes for each of "1, 2, ..., N" is expressed as "*". In addition, the substitution is described as a left arrow.

The CPU 100 instructs the audio processing unit 110 to start playing the read out music data (step S503) as well as to start measuring elapsed time t from this time point (corresponding to the current time) (step S504).

Then, the CPU 100 determines, regarding each of the target points in time T[1], T[2], T[N], whether to display the target images corresponding to any of the target point in time T[i] (step S505).

When the target image moving from top to bottom at speed v and reaching the aimed position placed apart from the superior end of the screen by the distance p, within the screen of height H, is supposed to correspond to the target point in time T[i], the position of the target image for the elapsed time t can be shown as below.

$$v(t-T[i])+p$$

Therefore, the period of time displaying the target image corresponding to the target point in time T[i] on the screen is established as shown below.

$$0 \leq v(t-T[i])+p \leq H$$

In other words, while the elapsed time t satisfies the following equation, the target image is displayed in the above-mentioned place.

$$T[i]-p/v \leq t \leq T[i]+H/v$$

Furthermore, for ease of understanding, in the embodiment described below, the number of target images corresponding to T[1], T[2], ..., T[N] to be displayed within the screen is at most one. In other words, the distance among T[1], T[2], T[N] is at least H/v. However, the distance can be arbitrarily changed according to the principle of the present invention.

In a case where the target image is not displayed within the screen (step S505; No), the CPU 101 generates an image according to the game status in the RAM 103 (step S531), waits till vertical synchronizing interrupt occurs (step S532), transfers the generated image to frame buffer after the vertical synchronizing interrupt occurred, displays the generated image on the television device 291 (step S533), and proceeds to step S521 subsequently.

On the other hand, in a case where the target image should be displayed within the screen (step S505; Yes), the CPU 101 generates an image arranged in a place where the target image to be displayed in the RAM 103 (step S506), waits till vertical synchronizing interrupt occurs (step S507), transfers the generated image to frame buffer after the vertical synchronizing interrupt occurred, and displays the generated image on the television device 291 (step S508). While waiting between the processes, other processes can be executed as a co-routine.

Then, whether the elapsed time t is included within the measurement zone in which the acceleration is measured or more specifically, whether the following equation is established is determined (step S509).

$$T[i]-D \leq t \leq T[i]+D$$

In a case where the elapsed time t is not included within the measurement zone in which the acceleration is measured or the above equation is not applicable (step S509; No), the variable a is set to 0 (step S510) and the process proceeds to step S521.

As described above, the period of time in which acceleration should be measured is determined to reduce the possibility of decision errors caused by motions other than players' intended motion of swinging the grip module 201.

On the other hand, if the elapsed time t is within the period of time in which the acceleration is measured (step S509; Yes), the accelerometer measures the current acceleration b of the grip module 201 (step S511).

Therefore, the accelerometer that the grip module 201 equips functions as the measurement unit 402 under the control of the CPU 101.

Furthermore, whether the variable a and the acceleration b are in a positional relationship being on either side of A and −A, or whether the following relationship is established is determined (step S512).

$$a<A<b,$$

$$b<A<a,$$

$$a<-A<b, \text{ or}$$

$$b<-A<a.$$

In a case where the above relationship is established (step S512; Yes), the CPU 101 extracts the elapsed time t, which represents the point in time when the threshold was reached, as the acceleration increases, or the point in time when the threshold was reached as the acceleration decreases (step S513). Furthermore, an extraction point may be a diving point according to the distance among a, A, and b or the distance among a, −A, and b instead of providing the elapsed time t as an extraction point as it is.

Therefore, the CPU 101 cooperates with the RAM 103, etc. to function as the extraction unit 403.

Subsequently, regarding the size of difference between the extraction point t and the target point in time T[i], or the error e=|t−T[i]|, whether the following relationship is established is determined (step S514).

$$e<w[i]$$

In a case where the above relationship is established (step S514; Yes), the size of the difference e between the extraction point t and the target point in time T[i] is stored as a smaller error to a variable w[i] (step S515).

Then, the acceleration b is stored to the variable a as a current value (step S516) and the process proceeds to step S521.

In a case where the variable a and the acceleration b are not be on either side of the thresholds A and −A (step S512; No) or in a case where the error at the extraction point is not minimum (step S514; No), the variable a is determined after proceeding to step S516, and subsequently the process proceeds to step S521.

Furthermore, whether music is finished playing is determined (step S521), and when the music is not finished playing (step S521; No), the process goes back to step S505.

When the music is finished playing (step S521; Yes), the player's score is calculated based on the variables w[1], w[2], w[N] stored in the RAM 103 (step S522).

The methods described below can be considered as score calculation.

(1) A method of giving score 1 when w[i]<S, and giving score 0 when w[i]<S is not applicable. In this method, the number of target points in time operated in good timing out of the N numbers of the target points in time can be counted.

(2) A method that a monotonically decreasing function f(x) sets a score for the."i"th variable w[i] as f(w[i]). A general analytic function may be used as the function f(x), or preparing a table that a range of x and the value of f(x) in that range correspond to each other in advance and referring the table.

Therefore, the CPU 101 cooperates with the RAM 103, etc. to function as the determination unit 404.

Then, the calculated score is displayed on the screen (step S523) and the process terminates.

Moreover, regarding the above-described flow of the control, the score was calculated together at the end. However, the score may be arbitrary calculated during the play and the score may be presented to the player in real time.

Additionally, in the above description, it is mentioned that swing up direction is positive acceleration to a direction along the rotation of the grip module 201 and swing down direction is negative acceleration thereto; however, the direction can be arbitrarily defined.

Furthermore, the acceleration to a centrifugal direction of the grip module 201 may be measured. In this case, a value that is proportionate to the approximate square of the rotating speed of the grip module 201 is measured as the acceleration. This can be described as follows:

(1) From a reference position to a preliminary motion (FIGS. 3A to 3B, points (a) to (b)), the acceleration increases from 0 to a slightly positive value m and returns to 0;

(2) from the preliminary motion to an end of swinging up (FIGS. 3B to 3D, points (b) to (d)), the acceleration increases from 0 to a significantly large value M and returns to 0;

(3) from the end of swinging up to an overshoot (FIGS. 3D to 3F, points (d) to (f)), the acceleration increases from 0 to a relatively large value N and returns to 0; and (4) from the overshoot to returning to the reference position (FIGS. 3F to 3G, points (f) to (g)), the acceleration increases from 0 to a slightly positive value n and returns to 0.

Therefore, in this case, a value between M and N may be employed as a first threshold for a typical player. Furthermore, when a second threshold is used, a value between N and m, n for the typical player may be employed.

The present application claims priority based on Japanese Patent Application No. 2008-037151 (filed on Feb. 19, 2008), the content of which is incorporated herein by reference to the fullest extent permitted by the law of the designated country.

INDUSTRIAL APPLICABILITY

As described above, according to the present invention, it is possible to provide a game device, a method for controlling a game, a computer-readable information recording medium that stored a program executing the device and method on a computer, and the program ideal for accurately determining the accuracy of operation regarding a game in which the competition is based on the ability to swing a controller at the target points in time.

The invention claimed is:

1. A game device determining accuracy of user's operation of a controller depending on whether a user moves a controller at a plurality of predetermined target points in time, the game device comprising:

a measurement unit that measures acceleration of the controller over a predetermined time zone associated with each predetermined target point;

an extraction unit that compares the measured acceleration of the controller, during the predetermined time zone associated with each target point, with a first threshold, and responsively stores an associated time point when the measured acceleration crosses the first threshold by an increasing acceleration and by a decreasing acceleration; and a determination unit that establishes, for each predetermined time zone, a selected time point, from the stored associated time points for the predetermined time zone, which is closest to the predetermined target point in time, and determines a score based on a difference between each target point in time and the associated selected time point.

2. The game device according to claim 1, wherein the extraction unit further compares the measured acceleration of the controller, during the predetermined time zone associated with each target point, with a second threshold, and responsively stores an associated time point when the measured acceleration crosses the second threshold and by an increasing acceleration and by a decreasing acceleration, the sign of the second threshold being a reverse sign of the first threshold.

3. The game device according to claim 1 or 2, wherein the measurement unit periodically measures the acceleration of the controller within each predetermined time zone, and the extraction unit interpolates the controller acceleration measured and extracts the time points at which the threshold(s) are reached.

4. A method for controlling a game executed by a measurement unit, an extraction unit, and a determination unit included in a game device determining accuracy of user's operation of a controller depending on whether a user moves a controller at a plurality of predetermined target points in time, the method includes:

a measuring step that a measurement unit measures acceleration of the controller over a predetermined time zone associated with each predetermined target point;

an extracting step that an extraction unit compares the measured acceleration of the controller, during the predetermined time zone associated with each target point, with a first threshold, and responsively stores an associated time point when the measured acceleration crosses the first threshold by an increasing acceleration and by a decreasing acceleration; and a determining step that a determination unit establishes for each predetermined time zone, a selected time point, from the stored associated time points for the predetermined time zone, which is closest to the target point in time, and determines a score based on the difference between each target point in time and the associated selected time point.

5. The method for controlling a game according to claim 4, wherein the extracting step further compares the measured acceleration of the controller, during the predetermined time zone associated with each target point, with a second threshold, and responsively stores an associated time point when the measured acceleration crosses the second threshold by an increasing acceleration by a decreasing acceleration, the sign of the second threshold being a reverse sign of the first threshold.

6. A non-transitory computer-readable information recording medium stored a program to execute a game determining accuracy of user's operation of a controller depending on whether a user moves a controller at a predetermined target point in time, the program causes a computer that the controller is connected to function as:

a measurement unit that measures acceleration of the controller over a predetermined time zone associated with each predetermined target point;

an extraction unit that compares the measured acceleration of the controller, during the predetermined time zone associated with each target point, with a first threshold, and responsively stores an associated time point when the measured acceleration crosses the first threshold by an increasing acceleration and by a decreasing acceleration; and a determination unit that establishes, for each predetermined time zone, a selected time point, from the stored associated time points for the predetermined time zone, which is closest to the predetermined target point in time, and determines a score based on a difference between each target point in time and the associated selected time point.

7. The non-transitory computer-readable information recording medium stored a program according to claim 6, wherein the extraction unit further compares the measured acceleration of the controller, during the predetermined time zone associated with each target point, with a second threshold, and responsively stores an associated time point when the measured acceleration crosses the second threshold and by an increasing acceleration and by a decreasing acceleration, the sign of the second threshold being a reverse sign of the first threshold.

* * * * *